United States Patent
Ueda et al.

(10) Patent No.: US 11,681,297 B2
(45) Date of Patent: Jun. 20, 2023

(54) AUTONOMOUS VEHICLE AND SELF-LOCATION ESTIMATING METHOD IN AUTONOMOUS VEHICLE

(71) Applicants: KABUSHIKI KAISHA TOYOTA JIDOSHOKKI, Aichi-ken (JP); SOUTHWEST RESEARCH INSTITUTE, San Antonio, TX (US)

(72) Inventors: Yuki Ueda, Kariya (JP); Takashi Uno, Kariya (JP); Daniel D'Souza, San Antonio, TX (US); Joseph Auchter, San Antonio, TX (US)

(73) Assignees: SOUTHWEST RESEARCH INSTITUTE, San Antonio, TX (US); KABUSHIKI KAISHA TOYOTA JIDOSHOKKI, Aichi-Ken (JP)

(*) Notice: Subject to any disclaimer, the term of this patent is extended or adjusted under 35 U.S.C. 154(b) by 168 days.

(21) Appl. No.: 17/190,049

(22) Filed: Mar. 2, 2021

(65) Prior Publication Data
US 2022/0283588 A1   Sep. 8, 2022

(51) Int. Cl.
*G05D 1/02* (2020.01)
*G06T 7/73* (2017.01)
(Continued)

(52) U.S. Cl.
CPC ........... *G05D 1/0231* (2013.01); *B60W 40/06* (2013.01); *B60W 60/001* (2020.02); *G01C 21/3822* (2020.08); *G05D 1/0274* (2013.01); *G06T 7/74* (2017.01); *B60W 2420/42* (2013.01); *G06T 2207/30252* (2013.01)

(58) Field of Classification Search
CPC ... G05D 1/0231; G05D 1/0274; B60W 40/06; B60W 60/001; B60W 2420/42; G01C 21/3822; G06T 7/74; G06T 2207/30252
See application file for complete search history.

(56) References Cited

U.S. PATENT DOCUMENTS 5,734,337 A * 3/1998 Kupersmit ............ G06T 7/246
                                                        382/104
8,725,413 B2    5/2014 Kozak et al.
(Continued)

FOREIGN PATENT DOCUMENTS

CN     104949619 A  *  9/2015  ......... G06K 9/00791
CN     109716060 A  *  5/2019  ............. G01B 11/25
(Continued)

*Primary Examiner* — Dale W Hilgendorf
(74) *Attorney, Agent, or Firm* — Greenblum & Bernstein, P.L.C.

(57) ABSTRACT

An autonomous vehicle includes first and second road surface image obtaining devices that are located on a bottom surface of the vehicle body and obtain images of a road surface below the vehicle body, respectively. The autonomous vehicle also includes a memory unit that stores a map image of the road surface, the map image being associated with geographical location information. The autonomous vehicle further includes first and second self-location estimating units that each compare a feature extracted from the image of the road surface obtained by corresponding one of the first and second road surface image obtaining devices with a feature extracted from the map image, thereby estimating a self-location of the autonomous vehicle.

5 Claims, 7 Drawing Sheets

(51) Int. Cl.
*B60W 60/00* (2020.01)
*G01C 21/00* (2006.01)
*B60W 40/06* (2012.01)

(56) References Cited

U.S. PATENT DOCUMENTS

| | | | | |
|---|---|---|---|---|
| 2009/0033744 | A1* | 2/2009 | Frantz | G01N 21/8806 |
| | | | | 348/148 |
| 2014/0005932 | A1* | 1/2014 | Kozak | G01C 21/3602 |
| | | | | 701/446 |
| 2015/0227775 | A1* | 8/2015 | Lewis | G06V 20/647 |
| | | | | 345/419 |
| 2016/0155219 | A1* | 6/2016 | Shigemura | G06T 5/50 |
| | | | | 382/284 |
| 2017/0015317 | A1* | 1/2017 | Fasola | B60W 40/10 |
| 2019/0107400 | A1* | 4/2019 | Zavodny | G06T 7/74 |
| 2020/0023772 | A1* | 1/2020 | Kurnaz | B60R 1/00 |
| 2020/0401819 | A1* | 12/2020 | Volkerink | G06V 20/56 |

FOREIGN PATENT DOCUMENTS

| | | | | | |
|---|---|---|---|---|---|
| JP | 2008225822 | A | * | 9/2008 | ............ G08G 1/16 |
| JP | 2021081272 | A | * | 5/2021 | ......... G01C 21/1652 |
| KR | 20140085844 | A | * | 7/2014 | ............ B60W 40/06 |
| WO | WO-2014020744 | A1 | * | 2/2014 | ............ B60W 40/072 |
| WO | WO-2015125299 | A1 | * | 8/2015 | ............ B60K 31/00 |

* cited by examiner

First Camera Image

Fig.7B

Map Image

Camera Image

Fig.12B

Map Image

Fig.13

AUTONOMOUS VEHICLE AND SELF-LOCATION ESTIMATING METHOD IN AUTONOMOUS VEHICLE

BACKGROUND

1. Field

The present disclosure relates to an autonomous vehicle and a self-location estimating method in the autonomous vehicle.

2. Description of Related Art

In recent years, study of accurate measurement of a self-location, for example, of an automated guided vehicle has been advanced. Methods for measuring a self-location include a method by which an automated guided vehicle detects a magnetic tape placed on the floor in order to measure the self-location. With this method, the automated guided vehicle travels along the detected magnetic tape. Methods that do not use a magnetic tape include simultaneous localization and mapping (SLAM), which simultaneously performs self-location estimation and generates an environment map. SLAM estimates a self-location on the basis of map information and information obtained through measurement using a camera or a distance sensor such as a laser range finder (LRF). SLAM has a lowered accuracy of self-location estimation when there are not many features in the environment (a case of a large outdoor space or a case of a monotonous and uninterrupted hallway) or when the environment changes. To cope with such an environment that reduces the accuracy of self-location estimation, objects with features (markers) are placed in the environment in some cases. However, when there are objects other than the markers in the environment and those objects are made of metal with a high reflectance, the objects may be erroneously detected as the markers. This reduces the accuracy of the self-location estimation. Self-location estimating methods used outdoors include a real-time kinematic global navigation satellite system (RTK-GNSS), which utilizes satellites. In the case of RTK-GNSS, when there are tall buildings in the surroundings or when there is a structure that blocks the upward field of view of the GNSS antenna, the self-location detection may be impossible or its accuracy is reduced. U.S. Pat. No. 8,725,413 discloses another technique for estimating self-location. This technique extracts features from an image of a road surface and prepares a map database that associates the extracted features with geographical location information. The technique also extracts features from the road surface when performing self-location estimation and checks the extracted features against those in the map database in order to perform self-location estimation. The technique disclosed in the above publication is capable of performing self-location estimation even in an environment in which SLAM or RTK-GNSS cannot easily perform self-location estimation.

Figure 12A:
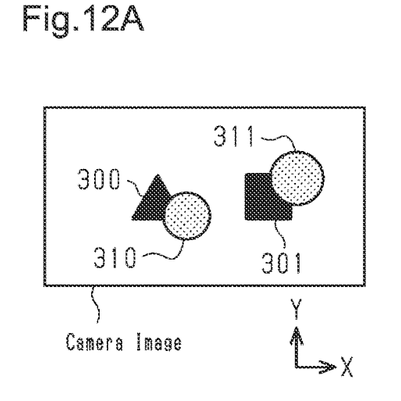
FIG. 12A is a diagram showing a camera image.
Figure 12B:
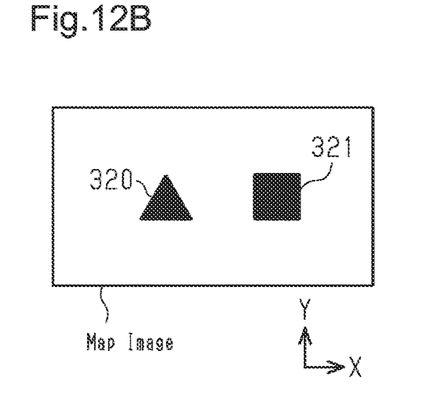
FIG. 12B is a diagram showing a map image.

When performing self-location estimation using the technique of the above publication, the sunshine condition may be different or the road surface may be partially covered with sand. In such a case, for example, as shown in FIG. 12A, a captured image (camera image) includes shapes of sand clusters 310, 311 in addition to features (patterns) 300, 301, which are original patterns on the road surface. As a result, when matching is performed between the captured image shown in FIG. 12A and a map image shown in FIG. 12B, the degree of similarity of the features (patterns) 300, 301 to features (patterns) 320, 321 in the map data is reduced. This may reduce the accuracy of location estimation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect of the present disclosure, an autonomous vehicle includes a vehicle body, a first road surface image obtaining device that is located on a bottom surface of the vehicle body and obtains an image of a road surface below the vehicle body, a second road surface image obtaining device that is located on the bottom surface of the vehicle body and obtains an image of the road surface below the vehicle body, a memory unit that stores a map image of the road surface, the map image being associated with geographical location information, a first self-location estimating unit that compares a feature extracted from the image of the road surface obtained by the first road surface image obtaining device with a feature extracted from the map image, thereby estimating a self-location of the autonomous vehicle, and a second self-location estimating unit that compares a feature extracted from the image of the road surface obtained by the second road surface image obtaining device with a feature extracted from the map image, thereby estimating the self-location of the autonomous vehicle. The first road surface image obtaining device and the second road surface image obtaining device obtain the images of the road surface alternately phased in time at specific intervals, and the first self-location estimating unit and the second self-location estimating unit output estimation results of the self-location of the autonomous vehicle alternately phased in time at specific intervals.

With this configuration, the first self-location estimating unit compares the feature extracted from the image of the road surface obtained by the first road surface image obtaining device with the feature extracted from the map image, thereby estimating the self-location of the autonomous vehicle. The second self-location estimating unit compares the feature extracted from the image of the road surface obtained by the second road surface image obtaining device with the feature extracted from the map image, thereby estimating the self-location of the autonomous vehicle. Thus, when the sunshine condition is different or the road surface is partially covered with sand, and a feature of the road surface cannot be obtained by one of the road surface image obtaining devices, the other road surface image obtaining device obtains the feature of the road surface, so as to increase the degree of similarity between the feature in the map image and the feature of the obtained road surface image. This prevents the accuracy of the self-location estimation from being reduced. In addition, the process by the first self-location estimating unit and the process by the second self-location estimating unit are executed in parallel. This shortens the cycle of output of the results of the self-location estimation. Accordingly, the results of the self-location estimation are readily obtained consecutively in chronological order. As a result, the self-location is highly accurately estimated.

The first road surface image obtaining device and the second road surface image obtaining device may be respectively provided in a left side and a right side of the vehicle body.

This configuration allows the first road surface image obtaining device and the second road surface image obtaining device to respectively obtain patterns of the road surface on the left side and the right side of the vehicle.

Also, at least one of the first road surface image obtaining device and the second road surface image obtaining device may include two road surface image obtaining devices respectively provided in a front portion and a rear portion of the vehicle body.

With this configuration, the attitude of the vehicle body is estimated using the two road surface image obtaining devices, which are respectively provided in the front portion and the rear portion of the vehicle body. This increases the accuracy of the estimation of the vehicle body attitude as compared to a case in which the attitude of the vehicle is estimated using a single road surface image obtaining device.

In another aspect of the present disclosure, a self-location estimating method in an autonomous vehicle is provided. The method includes: causing road surface image obtaining devices arranged on a bottom surface of a vehicle body to obtain images of a road surface below the vehicle body at points in time displaced from each other; estimating a self-location of the autonomous vehicle by comparing a feature extracted from the image of the road surface obtained by each of the road surface image obtaining devices with a feature extracted from a map image of the road surface associated with geographical location information; and outputting, at points in time displaced from each other, estimation results of the self-location of the autonomous vehicle, the estimation results having been obtained by using the images of the road surface obtained by the road surface image obtaining devices.

With this configuration, the feature extracted from the images of the road surface obtained by the respective road surface image obtaining devices is compared with the feature extracted from the map image of the road surface associated with the geographical location information, so that the self-location of the autonomous vehicle is estimated. Thus, when the sunshine condition is different or the road surface is partially covered with sand, and a feature of the road surface cannot be obtained by one of the road surface image obtaining devices, the other road surface image obtaining device obtains the feature of the road surface, so as to increase the degree of similarity between the feature in the map image and the feature of the obtained road surface image. This prevents the accuracy of the self-location estimation from being reduced. In addition, the cycle of output of the results of the self-location estimation is shortened. Accordingly, the results of the self-location estimation are readily obtained consecutively in chronological order. As a result, the self-location is highly accurately estimated.

The images of the road surface below the vehicle body may be obtained using the road surface image obtaining devices provided in a left side and a right side of the vehicle body.

This configuration allows the road surface image obtaining devices to obtain patterns of the road surface on the left side and the right side of the vehicle.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of the present disclosure will now be described with reference to the drawings.

Figure 1:
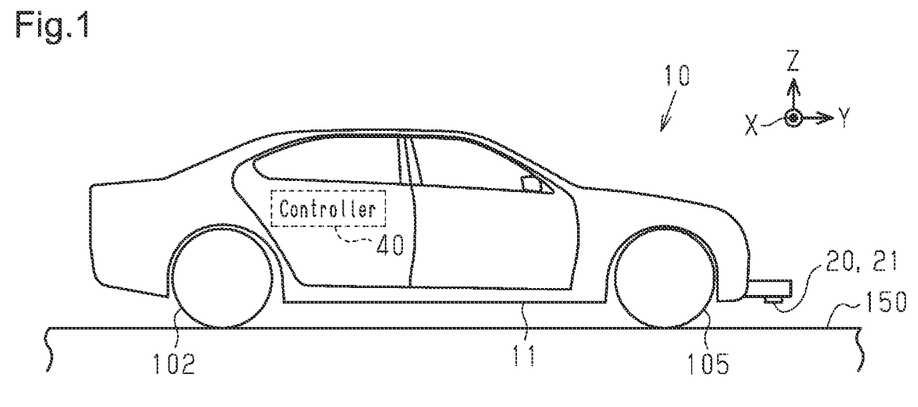
FIG. 1 is a side view of an autonomous vehicle of an embodiment.
Figure 2:
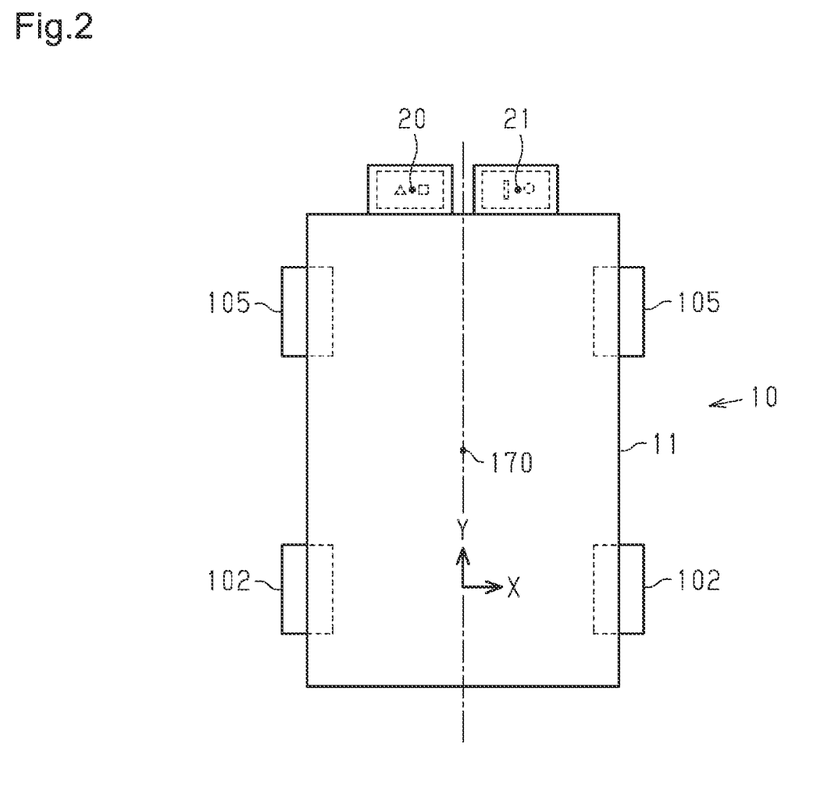
FIG. 2 is a plan view of the autonomous vehicle shown in FIG. 1.

As shown in FIGS. 1 and 2, an autonomous vehicle 10 is a four-wheel vehicle and includes a vehicle body 11, drive wheels 102 arranged in a lower portion of the vehicle body 11, and steered wheels 105 arranged in the lower portion of the vehicle body 11.

Figure 3:
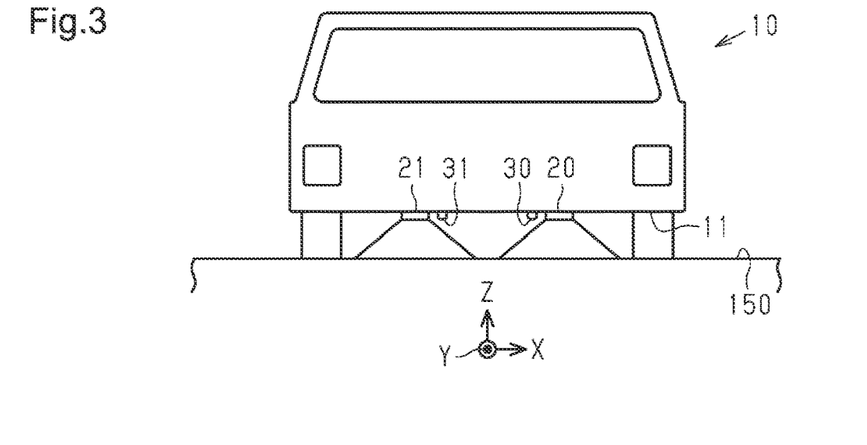
FIG. 3 is a front view of the autonomous vehicle shown in FIG. 1.

As shown in FIGS. 1, 2, and 3, the autonomous vehicle 10 includes a first camera 20 and a second camera 21. The first camera 20 is located on the left side on the bottom surface of the front portion of the vehicle body 11 and is capable of capturing images of a road surface 150 below the vehicle body 11. The first camera 20, which is a first road surface image obtaining device, is capable of obtaining images of the road surface 150 at a predetermined cycle. The second camera 21 is located on the right side on the bottom surface of the front portion of the vehicle body 11 and is capable of capturing images of the road surface 150 below the vehicle body 11. The second camera 21, which is a second road surface image obtaining device, is capable of obtaining images of the road surface 150 at a predetermined cycle. The first camera 20 and the second camera 21 are arranged on the left and right sides of the vehicle body 11.

Figure 7A:
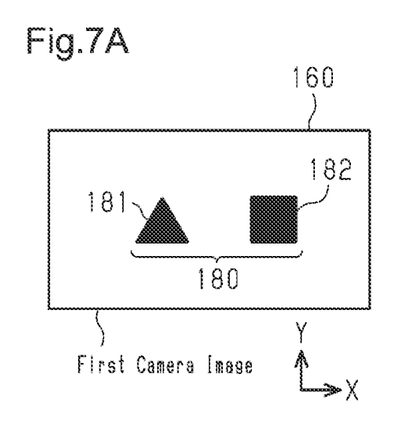
FIG. 7A is a diagram showing a first camera image.

FIG. 7A illustrates an example of an image 160 obtained by the first camera 20. The image 160 is rectangular. FIG. 10C illustrates an example of an image 161 obtained by the second camera 21. The image 161 is rectangular.

In FIGS. 1, 2, 3, 7A, 7B, 8, 9A, 9B, and 10A to 10D, the vertical direction is defined as a Z-direction. A horizontal direction orthogonal to the Z-direction is defined as an X-direction, which is the width direction of the vehicle. A horizontal direction orthogonal to the X-direction is defined as a Y-direction, which is the front-rear direction of the vehicle. The autonomous vehicle 10 travels on an XY-plane, which is a horizontal plane, while obtaining camera images.

As shown in FIG. 3, the autonomous vehicle 10 includes a first light source (illuminator) 30 for the first camera 20 and a second light source (illuminator) 31 for the second camera 21. The first light source 30 is provided on the bottom surface of the vehicle body 11. The first light source 30 includes, for example, a light emitting diode (hereinafter, simply referred to as LED). The first light source 30 is configured to irradiate an image capturing region of the first camera 20 on the road surface 150 with light. The first light source 30 is turned on in synchronization with image capturing timing of the first camera 20. The second light source 31 is provided on the bottom surface of the vehicle body 11. The second light source 31 includes, for example, an LED. The second light source 31 is configured to irradiate an image capturing region of the second camera 21 on the road surface 150 with light. The second light source 31 is turned on in synchronization with image capturing timing of the second camera 21.

Figure 4:
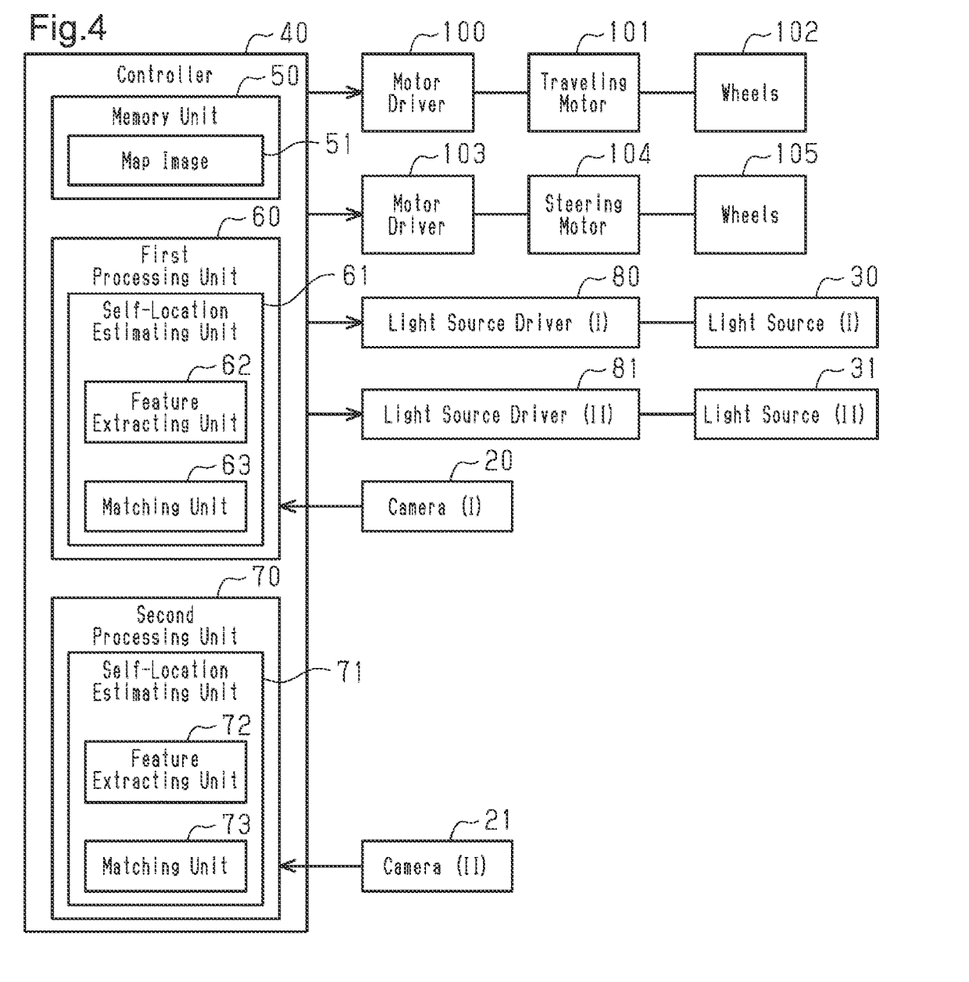
FIG. 4 is a block diagram showing an electrical configuration of the autonomous vehicle shown in FIG. 1.

As shown in FIG. 4, the autonomous vehicle 10 includes a controller 40, motor drivers 100, 103, a traveling motor 101, and a steering motor 104. The cameras 20, 21 are connected to the controller 40. The controller 40 is configured to drive the traveling motor 101 through the motor driver 100, thereby driving the drive wheels 102. The controller 40 is configured to drive the steering motor 104 through the motor driver 103, thereby driving the steered wheels 105.

As shown in FIG. 4, the autonomous vehicle 10 includes a first light source driver 80. The controller 40 is capable of controlling the first light source 30 through the first light source driver 80. The autonomous vehicle 10 includes a second light source driver 81. The controller 40 is capable of controlling the second light source 31 through the second light source driver 81.

As shown in FIG. 4, the controller 40 includes a memory unit 50, a first processing unit 60, and a second processing unit 70. The first processing unit 60 includes a first self-location estimating unit 61. The first self-location estimating unit 61 includes a feature extracting unit 62 and a matching unit 63. The second processing unit 70 includes a second self-location estimating unit 71. The second self-location estimating unit 71 includes a feature extracting unit 72 and a matching unit 73.

The memory unit 50 stores various programs for controlling the autonomous vehicle 10. The controller 40 may include dedicated hardware, for example, an application specific integrated circuit (ASIC), that executes at least part of various processes. That is, the controller 40 may be circuitry including one or more processors that operate according to a computer program, one or more dedicated hardware circuits such as an ASIC, or a combination thereof. The processor includes a CPU and memory such as a RAM, a ROM, and the like. The memory stores program codes or instructions configured to cause the CPU to execute processes. The memory, which is computer readable medium, includes any type of medium that is accessible by general-purpose computers and dedicated computers.

The controller 40 operates the autonomous vehicle 10 by controlling the traveling motor 101 and the steering motor 104 in accordance with programs stored in the memory unit 50. The autonomous vehicle 10 of the present embodiment is not operated by an occupant, and uses the controller 40 to automatically control its travelling and steering.

The memory unit 50 stores a map image 51 of the road surface. The map image 51 is an image of the road surface 150 that is captured beforehand. The map image 51 is generated to be associated with geographical location information. The map image 51 is generated while the autonomous vehicle 10 is traveling in the attitude shown in FIG. 2. The attitude angle θ of the vehicle body 11 in this state is zero (θ=0).

When the map image 51 is stored in the memory unit 50 beforehand, coordinates of patterns on the road surface are stored as an environment map. The environment map is generated by simultaneous localization and mapping (SLAM). SLAM simultaneously performs self-location estimation of a movable body and generates an environment map, and allows a movable body to generate an environment map under an unknown environment. Specific tasks are performed using the constructed map information. The self-location includes the location and the attitude of the vehicle body 11. The location of the vehicle body 11, more specifically, the coordinate representing one point in the vehicle body 11 as shown in FIG. 2 is, for example, the coordinate of a center 170 in the horizontal direction of the vehicle body 11. When performing self-location estimation, a road surface image obtained by a camera and a map image obtained beforehand are compared with each other, so as to estimate the self-location of an autonomous vehicle.

The controller 40 is capable of moving the autonomous vehicle 10 to a desired location by controlling the traveling motor 101 and the steering motor 104 while performing self-location estimation to estimate the location of the autonomous vehicle 10 on the map.

In the present embodiment, a dual processor system is employed. One of the processors functions as the first processing unit 60, and the other processor functions as the second processing unit 70. Thus, the first processing unit 60 and the second processing unit 70 are capable of performing simultaneous parallel processing.

Next, an operation will be described.

Figure 5:
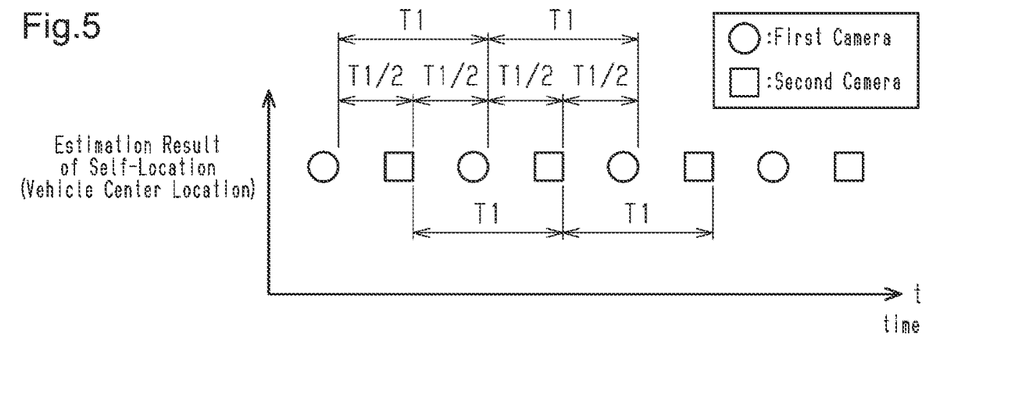
FIG. 5 is a timing diagram illustrating points in time at which self-location estimation is performed.

FIG. 5 shows points in time at which the controller 40 performs self-location estimation. Specifically, the light sources (illuminators) are turned on, images are captured by cameras, and image processing is performed, as illustrated in FIG. 6.

Figure 8:
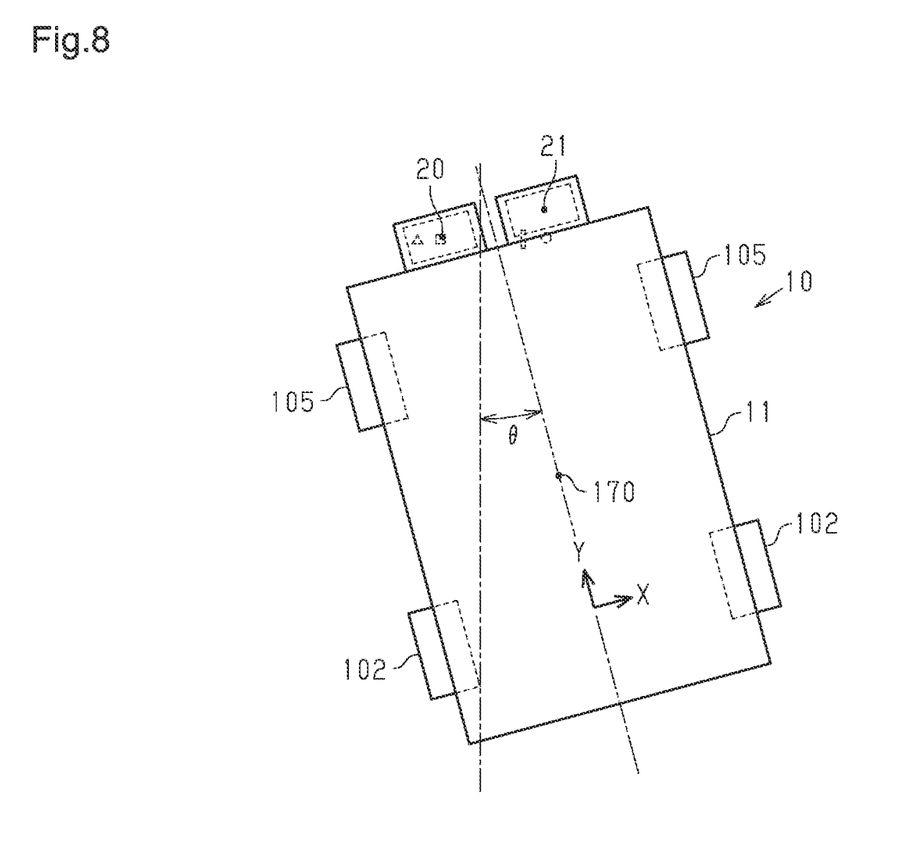
FIG. 8 is a plan view of the autonomous vehicle shown in FIG. 1.
Figure 9A:
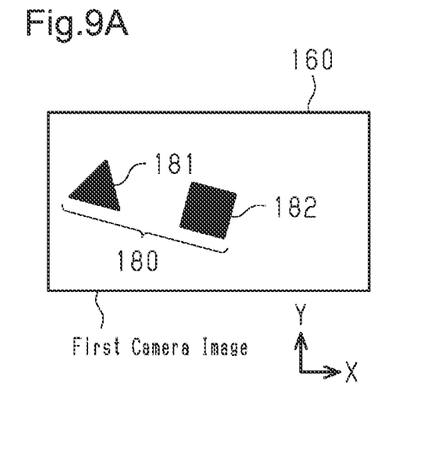
FIG. 9A is a diagram showing a first camera image.

When the attitude angle θ of the vehicle body 11 has a certain value as shown in FIG. 8 in relation to the case in which the attitude angle θ of the vehicle body 11 is 0 as shown in FIG. 2, the captured image (camera image) shown in FIG. 9A is obtained instead of the one shown in FIG. 7A.

Figure 10A:
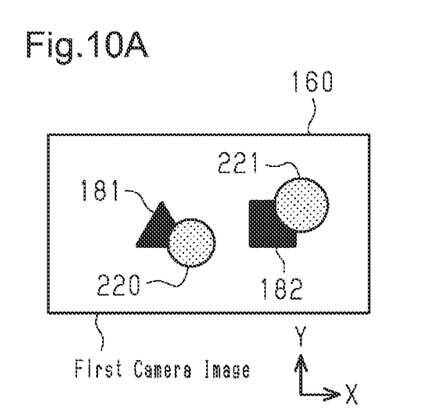
FIG. 10A is a diagram showing a first camera image.
Figure 10B:
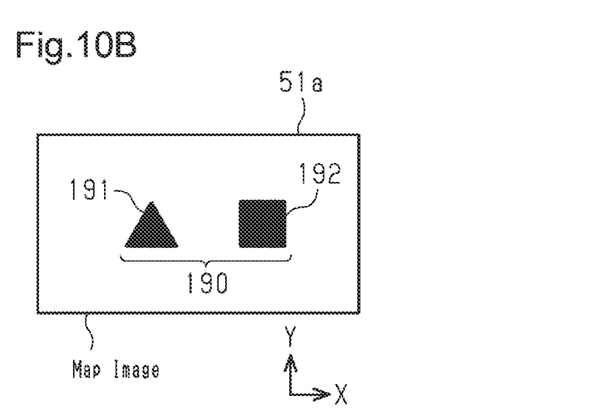
FIG. 10B is a diagram showing a map image.
Figure 10C:
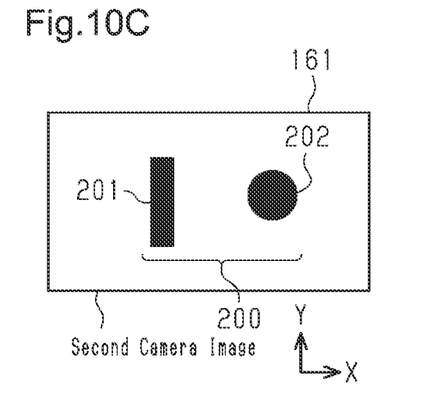
FIG. 10C is a diagram showing a second camera image.
Figure 10D:
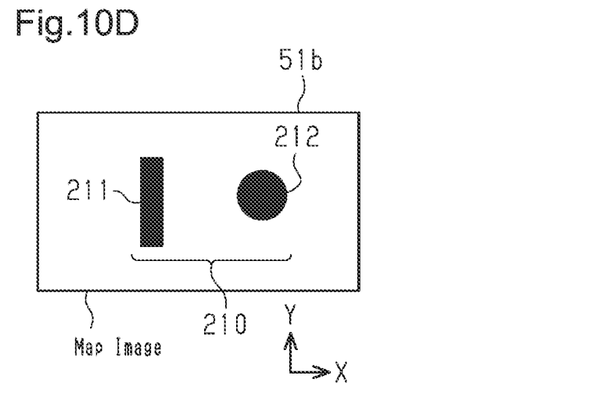
FIG. 10D is a diagram showing a map image.

FIGS. 10A and 10B illustrate an image 160 obtained by the first camera 20 and a corresponding map image 51a. FIGS. 10C and 10D illustrate an image 161 obtained by the second camera 21 and a corresponding map image 51b.

Figure 6:
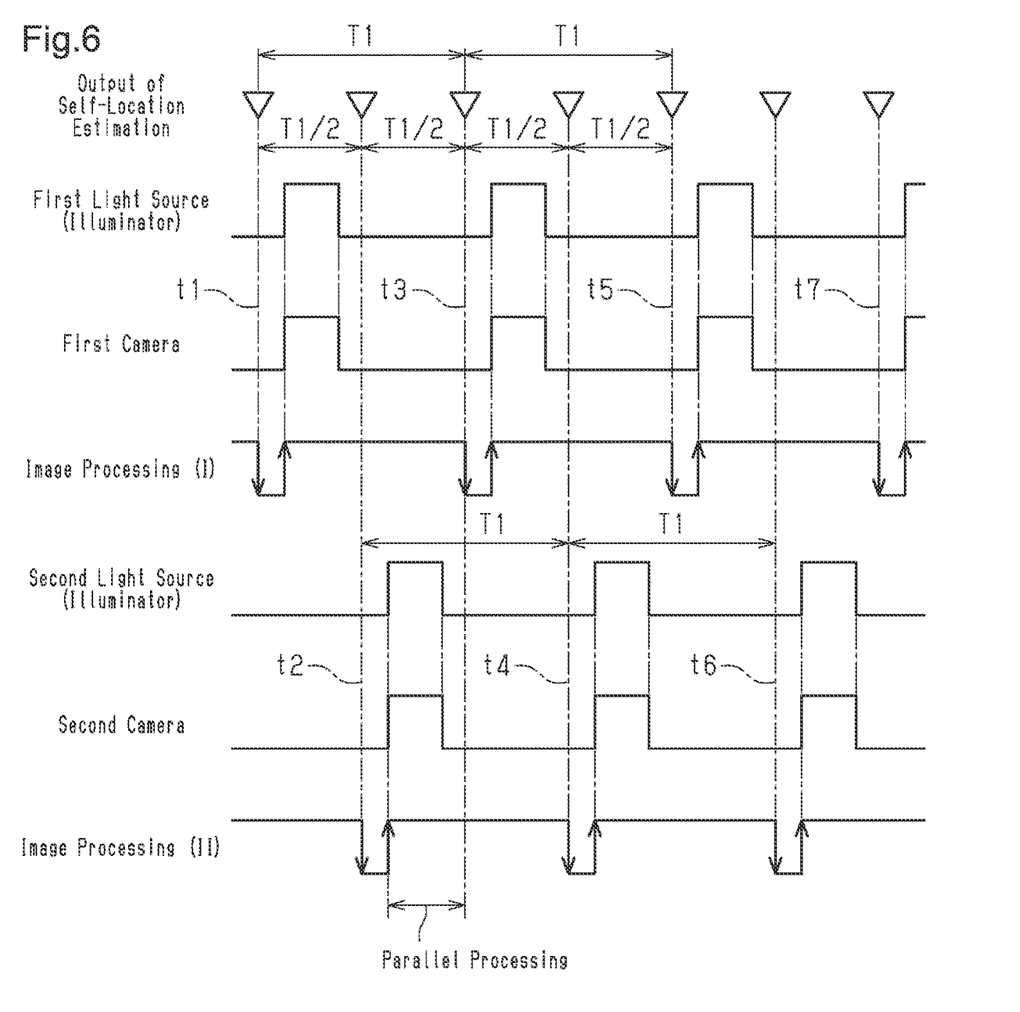
FIG. 6 is a timing diagram showing operations related to light sources, cameras, and image processing.

The controller 40 causes the first camera 20 to obtain an image of the road surface 150 below the vehicle body 11 at a predetermined cycle as shown in FIG. 6. Specifically, the first camera 20 captures an image of the road surface in synchronization with turning on of the first light source 30. The image obtained by the first camera 20 is subjected to image processing.

The first self-location estimating unit 61 compares a feature extracted from the image of the road surface 150 obtained by the first camera 20 with a feature extracted from the map image 51, thereby estimating the self-location of the autonomous vehicle.

Specifically, the feature extracting unit 62 of the first self-location estimating unit 61 extracts a feature set 180 from the image 160 of the road surface 150 obtained by the first camera 20 as shown in FIG. 7A. In the example of the camera image shown in FIG. 7A, the feature set 180 includes a solid triangle and a solid square, which represent patterns formed by unevenness of the road surface. The feature set 180 includes feature segments 181, 182. The matching unit 63 compares the extracted feature set 180 with a feature set 190 shown in FIG. 7B, which is extracted from the map image 51. In the example of the map image shown in FIG. 7B, the feature set 190 includes a solid triangle and a solid square, which represent patterns formed by unevenness of the road surface. The feature set 190 includes feature segments 191, 192. The first self-location estimating unit 61 estimates, as the self-location of the autonomous vehicle, the location of the vehicle body 11 (the coordinate of the center 170 of the vehicle body 11) and the attitude of the vehicle body 11 (the attitude angle θ of the vehicle body 11) as shown in FIGS. 2 and 8.

The controller 40 causes the second camera 21 to obtain an image of the road surface 150 below the vehicle body 11 at a predetermined cycle as shown in FIG. 6. Specifically, the second camera 21 captures an image of the road surface in synchronization with turning on of the second light source (illuminator) 31. The image obtained by the second camera 21 is subjected to image processing.

The second self-location estimating unit 71 compares a feature extracted from the image of the road surface 150 obtained by the second camera 21 with a feature extracted from the map image 51, thereby estimating the self-location of the autonomous vehicle.

Specifically, the feature extracting unit 72 of the second self-location estimating unit 71 extracts a feature set 200 from the image 161 of the road surface 150 obtained by the second camera 21 as shown in FIG. 10C. In the example of the camera image shown in FIG. 10C, the feature set 200 includes a solid rectangle and a solid circle, which represent patterns formed by unevenness of the road surface. The feature set 200 includes feature segments 201, 202. The matching unit 73 compares the extracted feature set 200 with a feature set 210 shown in FIG. 10D, which is extracted from the map image 51b. In the example of the map image shown in FIG. 10D, the feature set 210 includes a solid rectangle and a solid circle, which represent patterns formed by unevenness of the road surface. The feature set 210 includes feature segments 211, 212. The second self-location estimating unit 71 estimates the location of the vehicle body 11 and the attitude of the vehicle body 11 as the self-location of the autonomous vehicle.

The controller 40 causes the first camera 20 and the second camera 21 to obtain images of the road surface alternately phased in time at specific intervals as shown in FIG. 5.

As shown in FIG. 6, the first self-location estimating unit 61 and the second self-location estimating unit 71 output estimation results of the self-location of the autonomous vehicle alternately phased in time at specific intervals.

Figure 7B:
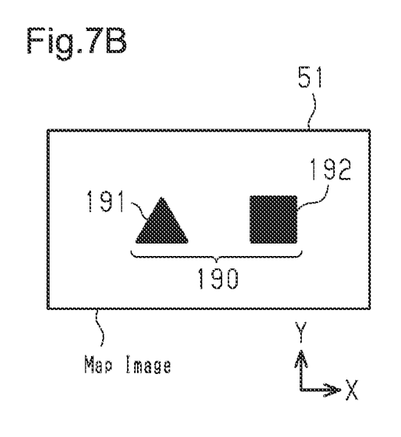
FIG. 7B is a diagram showing a map image.

Matching is performed between the first captured image (camera image) shown in FIG. 7A and the map image of FIG. 7B. If the features of these images are similar, the current location is determined from the geographical location information associated with the map image.

Figure 9B:
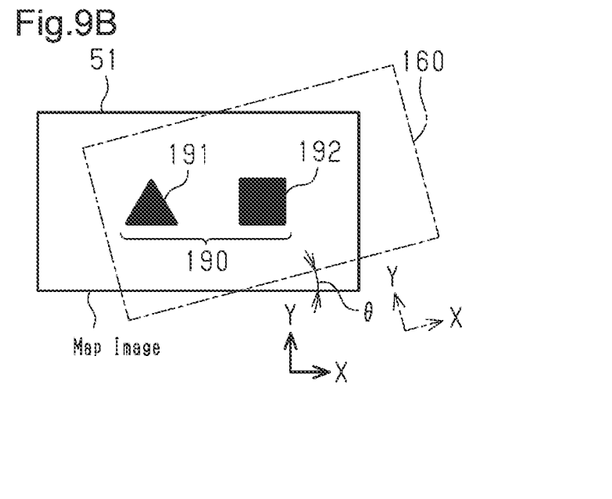
FIG. 9B is a diagram showing a map image.

On the other hand, matching is performed between the first captured image (camera image) 160 of FIG. 9A and the map image 51 of FIG. 9B, thereby calculating the attitude angle θ of the vehicle body 11 from the difference between the orientation of the feature set 180 in the captured image (camera image) 160 and the orientation of the feature set 190 in the map image 51.

For example, when sand clusters 220, 221 partially cover the road surface as shown in FIG. 10A, the first camera 20 cannot obtain a feature of the road surface in the matching with the map image 51a.

In this case, matching is performed between the second captured image (camera image) 161 shown in FIG. 10C and the map image 51b of FIG. 10D. If the features of these images are similar, the current location is determined from the geographical location information associated with the map image.

In this manner, the first self-location estimating unit 61 compares a feature extracted from the image of the road surface obtained by the first camera 20 with a feature extracted from the map image 51, thereby estimating the self-location of the autonomous vehicle. The second self-location estimating unit 71 compares a feature extracted from the image of the road surface obtained by the second camera 21 with a feature extracted from the map image 51, thereby estimating the self-location of the autonomous vehicle.

The first camera 20 and the second camera 21 obtain images of the road surface alternately phased in time at specific intervals. In FIG. 6, points in time at which the first self-location estimating unit 61 outputs results of the self-location estimation are represented by t1, t3, t5, t7, . . . . The cycle of output of the results of the self-location estimation, which corresponds to the period from t1 to t3, the period from t3 to t5, and the like, is represented by T1. In FIG. 6, points in time at which the second self-location estimating unit 71 outputs results of the self-location estimation are represented by t2, t4, t6, . . . . The cycle of output of the results of the self-location estimation, which corresponds to the period from t2 to t4 and the period from t4 to t6, is represented by T1. Thus, the first self-location estimating unit 61 and the second self-location estimating unit 71 output estimation results of the self-location of the autonomous vehicle alternately phased in time at specific intervals, and the cycle of output of the results of the self-location estimation from the estimating units 61, 71 is represented by T1/2.

In this manner, the self-location is highly accurately estimated without placing markers in a large outdoor space or in an environment in which the RTK-GNSS cannot be used. To achieve such a configuration, a feature set is extracted from a camera image captured by a camera. A map database is searched for a feature set that agrees with the extracted feature set. Feature sets in the map database are associated with geographical location information, and the location of a movable body is estimated and calculated from the geographical location information and relative locations of the feature set of the camera image and the feature set of the map image. As shown in FIG. 3, the vehicle body 11 is provided with multiple devices that obtain images (for example, optical cameras), and the location and the attitude of the vehicle body 11 are calculated from images obtained by the cameras. The points in time at which information of the location and the attitude is outputted from the cameras are displaced from each other, so that the location information output frequency is increased. This improves vehicle guidance accuracy.

As shown in FIGS. 9A and 9B, the two cameras 20, 21 mounted on the vehicle body 11 obtain images. Matching is performed between the feature sets of the obtained images and the feature sets of the map image. On the basis of the result of the matching, the location and the attitude of the vehicle body 11 are estimated and calculated. As shown in FIG. 5, location-attitude information calculated from the images obtained by the respective cameras is outputted at points in time displaced from each other. The displaced points in time of output increase the location information output frequency. This improves the vehicle guidance accuracy. Also, as shown in FIGS. 10A to 10D, when self-location estimation cannot be performed with a single camera, the remaining camera can be used to perform self-location estimation. This improves the redundancy.

Thus, the self-location is highly accurately estimated without placing markers in the following situations: a situation in which the self-location estimation is difficult (a large outdoor space or changing environment) in the case of simultaneous localization and mapping (SLAM) with a ranging sensor; and a situation in which the self-location estimation with real-time kinematic global navigation satellite system (RTK-GNSS) is difficult (an environment in which there are tall buildings in the surroundings or when there is a structure that blocks the upward field of view of a GNSS antenna). Also, the location and the attitude of the vehicle body 11 are estimated on the basis of the images obtained by multiple cameras, and the estimation results are outputted at points in time displaced from each other. This allows the estimation results to be outputted at short cycles, and thus improves the vehicle guidance accuracy. Also, the location and the attitude of the vehicle body 11 are estimated on the basis of the images obtained by multiple cameras. Thus, even if the self-location estimation cannot be performed on the basis of the image obtained by a single camera, for example, when the road surface is partially covered with sand, the self-location estimation can be performed on the basis of the image obtained by the other camera. This ensures redundancy.

A more specific description will be given below.

In a related art, a single camera, which functions as a road surface image obtaining device, captures an image of a road surface at a predetermined cycle. A feature extracted from the image of the road surface obtained by the camera is compared with a feature extracted from a map image. The self-location of an autonomous vehicle is estimated on the basis of the comparison. This related art operates in the following manner.

Figure 13:
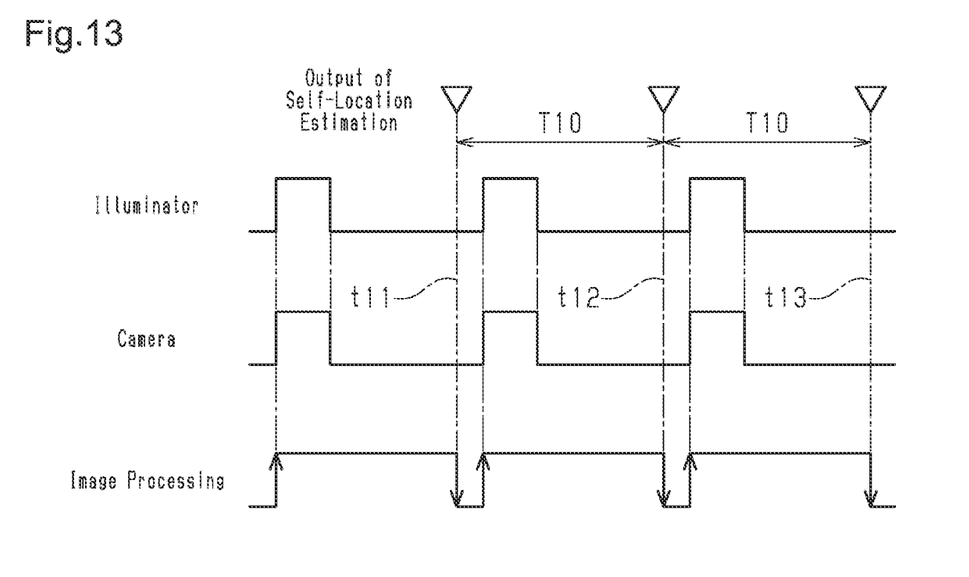
FIG. 13 is a timing diagram showing operations related to light sources, cameras, and image processing.

An exemplary case assumes that the sunshine condition is different or the road surface is partially covered with sand. In this case, a captured image (camera image) of FIG. 12A includes shapes of sand clusters 310, 311 in addition to features (patterns) 300, 301, which are original patterns on the road surface. As a result, when matching is performed between the captured image (camera image) of FIG. 12A and a map image of FIG. 12B, the degree of similarity between of the features (patterns) 320, 321 of the map image and the features (patterns) 300, 301 of the road surface image is reduced. This reduces the accuracy of location estimation. Also, as shown in FIG. 13, when the captured image (camera image) is processed while turning on the light source (illuminator) in synchronization with image capturing by the camera, the process of extracting a feature from the captured image (camera image) and the matching process take a certain amount of time. Accordingly, the process by the self-location estimating unit takes a certain amount of time. Accordingly, points in time at which the results of the self-location estimation are output are represented by t11, t12, t13, . . . , and the cycle is represented by T10. This configuration cannot shorten the cycle T10 of output of the results of the self-location estimation. Accordingly, the results of the self-location estimation cannot be readily obtained consecutively in chronological order (the output frequency of the results of the location estimation cannot be increased).

In contrast, the present embodiment operates in the following manner. For example, when the sunshine condition is different or the road surface is partially covered with sand, and a feature of the road surface cannot be obtained by one camera, another camera obtains the feature of the road surface, so as to increase the degree of similarity between the feature in the map image and the feature of the road surface image. This prevents the accuracy of the self-location estimation from being reduced. The process by the first self-location estimating unit 61 and the process by the second self-location estimating unit 71 are executed in parallel. In other words, the processes are executed partially simultaneously. This shortens the cycle of output T1/2 (refer to FIG. 6) of the results of the self-location estimation. Accordingly, the results of the self-location estimation are readily obtained consecutively in chronological order. Specifically, the cycle T1/2 shown in FIG. 6 is a half of the cycle T10 shown in FIG. 13. Thus, the output cycle is reduced to half, and the frequency is doubled. As a result, the self-location is highly accurately estimated.

The above-described embodiment has the following advantages.

(1) The autonomous vehicle 10 includes the first camera 20 and the second camera 21. The first camera 20 is the first road surface image obtaining device that is located on the bottom surface of the vehicle body 11 and obtains the image 160 of the road surface 150 below the vehicle body 11. The second camera 21 is the second road surface image obtaining device that is located on the bottom surface of the vehicle body 11 and obtains the image 161 of the road surface 150 below the vehicle body 11. The autonomous vehicle 10 also includes the memory unit 50, which stores the map image 51 of the road surface 150 associated with the geographical location information. The autonomous vehicle 10 further includes the first self-location estimating unit 61 and the second self-location estimating unit 71. The first self-location estimating unit 61 compares the feature extracted from the image 160 of the road surface 150 obtained by the first camera 20 with the feature extracted from the map image 51, thereby estimating the self-location of the autonomous vehicle. The second self-location estimating unit 71 compares the feature extracted from the image 161 of the road surface 150 obtained by the second camera 21 with the feature extracted from the map image 51, thereby estimating the self-location of the autonomous vehicle. Thus, when the sunshine condition is different or the road surface is partially covered with sand, and a feature of the road surface cannot be obtained by one of the road surface image obtaining devices, the other road surface image obtaining device obtains the feature of the road surface, so as to increase the degree of similarity between the feature in the map image and the feature of the obtained road surface image. This prevents the accuracy of the self-location estimation from being reduced.

(2) The first camera 20 and the second camera 21 obtain images of the road surface 150 alternately phased in time at specific intervals. The first self-location estimating unit 61 and the second self-location estimating unit 71 output results of the self-location estimation of the autonomous vehicle alternately phased in time at specific intervals. Thus, the process by the first self-location estimating unit 61 and the process by the second self-location estimating unit 71 are executed in parallel. This shortens the cycle of output of the results of the self-location estimation. Accordingly, the results of the self-location estimation are readily obtained consecutively in chronological order. As a result, the self-location is highly accurately estimated.

(3) The first camera 20 and the second camera 21 are respectively arranged on the left and right sides of the vehicle body 11. This configuration allows the first camera 20 and the second camera 21 to respectively obtain patterns of the road surface 150 on the left side and the right side of the vehicle body 11.

(4) The first self-location estimating unit 61 compares the feature set 180 extracted from the image 160 of the road surface 150 captured by the first camera 20 with the feature set 190 extracted from the map image 51, thereby estimating the self-location of the autonomous vehicle including the location and the attitude (attitude angle θ) of the vehicle body 11. The second self-location estimating unit 71 compares the feature set 200 extracted from the image 161 of the road surface 150 captured by the second camera 21 with the feature set 210 extracted from the map image 51, thereby estimating the self-location of the autonomous vehicle including the location and the attitude (attitude angle θ) of the vehicle body 11. This allows the self-location of the autonomous vehicle, which includes the location and the attitude of the vehicle body 11, to be estimated by using the feature sets obtained from the images 160, 161 of the road surface 150.

(5) The self-location estimating method in the autonomous vehicle includes a step that obtains images of the road surface 150 below the vehicle body 11 using the cameras 20, 21, which are road surface image obtaining devices provided on the bottom surface of the vehicle body 11. The self-location estimating method also includes a step that compares the features extracted from the images of the road surface 150 captured by the cameras 20, 21 with the feature extracted from the map image 51 of the road surface 150 associated with the geographical location information, thereby estimating the self-location of the autonomous vehicle. Thus, when the sunshine condition is different or the road surface is partially covered with sand, and a feature of the road surface cannot be obtained by one of the road surface image obtaining devices, the other road surface image obtaining device obtains the feature of the road surface, so as to increase the degree of similarity between the feature in the map image and the feature of the obtained road surface image. This prevents the accuracy of the self-location estimation from being reduced.

(6) The self-location estimating method in the autonomous vehicle causes the cameras 20, 21 to obtain images of the road surface 150 at points in time displaced from each other. The method outputs the estimation results of the self-location of the autonomous vehicle obtained by using the obtained images of the road surface 150 at points in time displaced from each other. This configuration shortens the cycle of output of the results of the self-location estimation. Accordingly, the results of the self-location estimation are readily obtained consecutively in chronological order. As a result, the self-location is highly accurately estimated.

(7) The self-location estimating method in the autonomous vehicle is capable of obtaining the patterns of the road surface on the left side and the right side of the vehicle body 11 by using the cameras 20, 21 provided on the left and right sides of the vehicle body 11.

The present disclosure is not limited to the above-described embodiment, but may be modified as follows.

Figure 11:
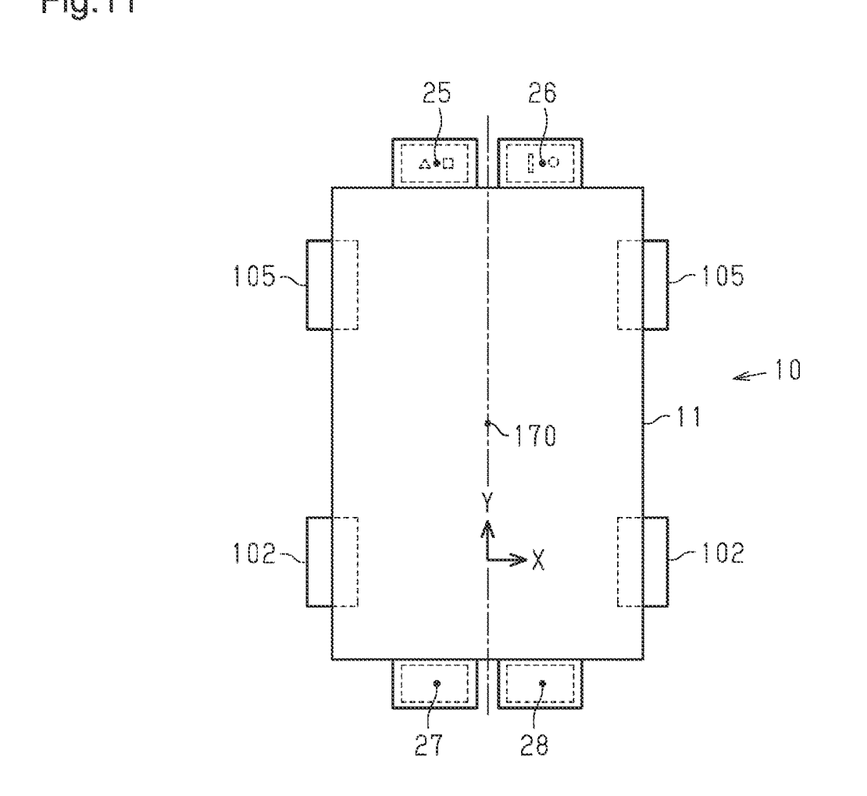
FIG. 11 is a plan view of an autonomous vehicle of a modification.

As shown in FIG. 11, two or more cameras 25, 26, 27, 28 may be provided in each of the front portion and the rear portion of the vehicle body 11. In FIG. 11, two cameras 25, 26 are arranged side by side in the front portion of the vehicle body 11, and two cameras 27, 28 are arranged side by side in the rear portion of the vehicle body 11. The camera 25 and the camera 27 are two first cameras respectively arranged in the front portion and the rear portion of the vehicle body 11. The camera 26 and the camera 28 are two second cameras respectively arranged in the front portion and the rear portion of the vehicle body 11.

The location of the vehicle body 11 is estimated on the basis of the result of matching between the features of the images obtained by the cameras 25 to 28 and the features of the map image. Also, the attitude of the vehicle body 11 is estimated on the basis of images captured by a pair of cameras: a camera in the front portion and a camera in the rear portion. In this case, the attitude of the vehicle body 11 is estimated from the images captured at two locations spaced apart from each other in the front-rear direction of the vehicle. This improves the accuracy of the attitude estimation as compared to a case in which the attitude of the vehicle body 11 is estimated using a single camera.

The points in time at which a left camera and a right camera output images may be displaced from each other. Specifically, the left and right cameras 25, 26 in the front portion and/or the left and right cameras 27, 28 in the rear portion may output images at points in time displaced from each other, so that location-attitude information of the vehicle body obtained on the basis of the images obtained by the left and right cameras are output at different points in time. This increases the location information output frequency. Also, the attitude of the vehicle body 11 is estimated on the basis of the images obtained by a pair of a front camera and a rear camera. This improves the accuracy of the attitude estimation as compared to a case in which the attitude of the vehicle body 11 is estimated using a single camera.

As described above, the autonomous vehicle includes at least one of the set of the first cameras, which are the first road surface image obtaining devices, and the set of the second cameras, which are the second road surface image obtaining devices, and the cameras of either set is arranged in the front portion and the rear portion of the vehicle body 11. With this configuration, the attitude of the vehicle body is estimated using the two road surface image obtaining devices, which are respectively provided in the front portion and the rear portion of the vehicle body. This increases the accuracy of the estimation of the vehicle body attitude as compared to a case in which the attitude of the vehicle is estimated using a single road surface image obtaining device.

The number of cameras is not limited, as long as two or more cameras are provided. The image capturing ranges on the road surface 150 of the cameras may be separated from each other or overlap with each other. The cameras may capture images of the same range of the road surface 150 from different directions.

In the above-described embodiments, the road surface image obtaining devices are the cameras 20, 21. However, devices other than cameras may be used as the road surface image obtaining devices. For example, linear sensors (linear image sensors) may be used as the road surface image obtaining devices.

In the above-described embodiment, a dual processor system is used that includes two processors capable of performing simultaneous parallel processing. One of the processors functions as the first processing unit 60, and the other processor functions as the second processing unit 70. However, the present disclosure is not limited to this. A single processor may be used to function as the first processing unit 60 and the second processing unit 70. In this case, the first processing unit 60 and the second processing unit 70 perform image processing at points in time displaced from each other.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

DESCRIPTION OF THE REFERENCE NUMERALS

10 . . . Autonomous Vehicle; 11 . . . Vehicle Body; 20 . . . First Camera; 21 . . . Second Camera; 50 . . . Memory Unit; 51 . . . Map Image; 61 . . . First Self-Location Estimating Unit; 71 . . . Second Self-Location Estimating Unit; 150 . . . Road Surface; 160 . . . Image; 161 . . . Image

What is claimed is:

1. An autonomous vehicle, comprising:
a vehicle body;
a first road surface image obtaining device that is located on a bottom surface of the vehicle body and obtains a first image of a road surface below the vehicle body;
a second road surface image obtaining device that is located on the bottom surface of the vehicle body and obtains a second image of the road surface below the vehicle body;
a memory unit that stores a map image of the road surface, the map image being associated with geographical location information;
a first self-location estimating unit that compares a first feature extracted from the first image of the road surface obtained by the first road surface image obtaining device with a first feature extracted from the map image to estimate a self-location of the autonomous vehicle; and
a second self-location estimating unit that compares a second feature extracted from the second image of the road surface obtained by the second road surface image obtaining device with a second feature extracted from the map image to estimate the self-location of the autonomous vehicle, wherein
the first road surface image obtaining device and the second road surface image obtaining device respectively obtain the first and second images of the road surface alternately phased in time at specific intervals,
the first self-location estimating unit and the second self-location estimating unit output estimation results of the self-location of the autonomous vehicle alternately phased in time at specific intervals,
the second road surface image obtaining device starts obtaining the second image of the road surface while the first self-location estimating unit estimates the self-location of the autonomous vehicle, and
the first road surface image obtaining device starts obtaining the first image of the road surface while the second self-location estimating unit estimates the self-location of the autonomous vehicle.

2. The autonomous vehicle according to claim 1, wherein the first road surface image obtaining device and the second road surface image obtaining device are respectively provided in a left side and a right side of the vehicle body.

3. The autonomous vehicle according to claim 1, wherein at least one of the first road surface image obtaining device and the second road surface image obtaining device includes two road surface image obtaining devices respectively provided in a front portion and a rear portion of the vehicle body.

4. A self-location estimating method in an autonomous vehicle, comprising:
causing road surface image obtaining devices arranged on a bottom surface of a vehicle body to each obtain an image of a road surface below the vehicle body at points in time displaced from each other;
estimating a self-location of the autonomous vehicle by comparing a feature extracted from the image of the road surface obtained by the road surface image obtaining devices with a feature extracted from a map image of the road surface associated with geographical location information;
outputting, at points in time displaced from each other, estimation results of the self-location of the autonomous vehicle, the estimation results having been obtained by using the images of the road surface obtained by the road surface image obtaining devices; and
during the estimating of the self-location of the autonomous vehicle based on the image of the road surface obtained by one of the road surface image obtaining devices, causing another one of the road surface image obtaining devices to start obtaining its respective image of the road surface.

5. The self-location estimating method in the autonomous vehicle according to claim 4, further comprising obtaining the images of the road surface below the vehicle body using the road surface image obtaining devices provided in a left side and a right side of the vehicle body.

\* \* \* \* \*